United States Patent
Lao (10) Patent No.: US 8,970,701 B2
(45) Date of Patent: Mar. 3, 2015

(54) SYSTEM AND METHOD FOR PREDICTING VEHICLE LOCATION

(75) Inventor: Yuanwei Lao, Katy, TX (US)

(73) Assignee: Mesa Engineering, Inc., Houston, TX (US)

(*) Notice: Subject to any disclaimer, the term of this patent is extended or adjusted under 35 U.S.C. 154(b) by 684 days.

(21) Appl. No.: 13/278,366

(22) Filed: Oct. 21, 2011

(65) Prior Publication Data
US 2013/0100286 A1    Apr. 25, 2013

(51) Int. Cl.
- H04N 7/18 (2006.01)
- G06K 9/00 (2006.01)
- G08G 1/017 (2006.01)
- G08G 1/04 (2006.01)
- G08G 1/054 (2006.01)

(52) U.S. Cl.
CPC .......... *G06K 9/00785* (2013.01); *G08G 1/0175* (2013.01); *G08G 1/04* (2013.01); *G08G 1/054* (2013.01)
USPC .......................................................... 348/149

(58) Field of Classification Search
USPC ........................................................... 348/149
See application file for complete search history.

(56) References Cited

U.S. PATENT DOCUMENTS

| | | | |
|---|---|---|---|
| 6,590,999 B1 | 7/2003 | Comaniciu et al. | |
| 7,433,889 B1 * | 10/2008 | Barton | 1/1 |
| 2010/0322476 A1 * | 12/2010 | Kanhere et al. | 382/103 |
| 2011/0182473 A1 * | 7/2011 | Wang | 382/103 |
| 2011/0267460 A1 * | 11/2011 | Wang | 348/135 |

OTHER PUBLICATIONS

Stauffer, Chris et al., "Adaptive Background Mixture Models for Real-Time Tracking," The Artificial Intelligence Laboratory, Massachusetts Institute of Technology, Cambridge, MA 02139, (7 pages).
Comaniciu, Dorin et al., "Kernel-Based Object Tracking," IEEE Transactions on Pattern Analysis and Machine Intelligence, vol. 25, No. 5, May 2003, pp. 564-577.

\* cited by examiner

*Primary Examiner* — Sath V Perungavoor
*Assistant Examiner* — Jeffery Williams
(74) *Attorney, Agent, or Firm* — Conley Rose, P.C.

(57) ABSTRACT

A system and method for detecting a traffic signal violation. In one embodiment a system includes a video image capture device, an image rectifier, and a vehicle position predictor. The image rectifier is configured to provide a rectified image by applying a rectification function an image captured by the video image capture device. The vehicle position predictor is configured to provide a prediction, based on the rectified image, of whether a vehicle approaching an intersection will enter the intersection.

28 Claims, 6 Drawing Sheets

SYSTEM AND METHOD FOR PREDICTING VEHICLE LOCATION

BACKGROUND

Traffic signals, also known as traffic lights, are typically provided at street intersections to control the flow of vehicular traffic through the intersection. By controlling traffic flow, the signals reduce the number of accidents due to cross traffic at the intersection and, relative to other traffic control methods, improve travel time along the intersecting streets.

Traffic signal infractions are considered among the more egregious traffic violations because of the high potential for bodily injury and property damage resulting from collisions caused by signal infractions. To encourage adherence to traffic signals, violators may be subject to fines or other penalties.

Because the potential consequences of signal violations are severe, it is desirable that adherence to the signal be monitored to the maximum extent feasible. To optimize signal monitoring, automated systems have been developed to detect and record signal violations. Such systems generally rely on one or more inductive loops embedded in the roadway to detect vehicles approaching an intersection. The systems acquire photographs or other images documenting the state of the traffic signal and the vehicle violating the signal. The images are provided to enforcement personnel for review.

SUMMARY

A system and method for detecting a traffic signal violation based on a rectified image of a vehicle approaching the traffic signal are disclosed herein. In one embodiment, a system includes a video image capture device, an image rectifier, and a vehicle position predictor. The image rectifier is configured to provide a rectified image by applying a rectification function to an image captured by the video image capture device. The vehicle position predictor is configured to provide a prediction, based on the rectified image, of whether a vehicle approaching an intersection will enter the intersection.

In another embodiment, a method for predicting signal violations includes capturing, by an intersection monitoring device, a video image of a street intersection. A vehicle approaching the intersection is identified in a frame of the video image. A frame of the video image is rectified. Whether the vehicle approaching the intersection will enter the intersection without stopping is predicted based on the rectified image.

In a further embodiment, a computer-readable storage medium is encoded with instructions that when executed cause a processor to store a video image of a street intersection. Additional instructions cause the processor to identify a vehicle approaching the intersection in a frame of the video image. Yet further instruction causes the processor to rectify the video image, and to predict, based on the rectified image, whether the vehicle approaching the intersection will enter the intersection.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

DETAILED DESCRIPTION

The following discussion and drawings is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. The drawing figures are not necessarily to scale. Certain features of the invention may be shown exaggerated in scale or in somewhat schematic form, and some details of conventional elements may not be shown in the interest of clarity and conciseness.

A conventional traffic monitoring system, such as a conventional system for monitoring an intersection for traffic signal violations, requires connection to and/or installation of site infrastructure to enable and/or support operation of the monitoring system. For example, a conventional intersection monitoring system may require installation of inductive loops (e.g., 2 loops) beneath the surface of the roadway for detection of approaching vehicles, construction of equipment mounting structures to position the system, extension of utilities to power the system, and/or extension of high bandwidth telemetry networks to provide communication with the system. Requiring such infrastructure greatly increases the cost of implementing a conventional traffic monitoring system.

Traffic monitoring systems may be positioned at locations where traffic violations frequently occur. For example, an intersection monitoring system may be positioned at an intersection where red-light violations frequently occur. After the monitoring system has been in operation for a period of time, traffic violations at the monitored location may decline substantially. Having reduced infractions at the monitored intersection, it may be desirable to relocate the monitoring system to a different site where violations are more frequent. Unfortunately, relocating the monitoring system may mean that the infrastructure added to the monitored location must be abandoned. Moreover, additional expense may be incurred to add monitoring system support infrastructure to the different site. Thus, the cost of the infrastructure required to support traffic monitoring systems tends to discourage use and/or reuse of the systems.

Embodiments of the present disclosure include a self-contained traffic monitoring system that requires minimal infrastructure support. More specifically, embodiments include a single unit that performs all the functions of intersection monitoring with no requirement for external sensors, connection to the power mains, connection to a signal control system, or hard-wired network connections. Embodiments of the system may be mounted to an existing structure that provides a view of the intersection to be monitored, and thereafter the system autonomously acquires, records, and wirelessly communicates signal infraction information to an infraction review system where personnel may review the information.

The traffic monitoring system disclosed herein predicts whether a vehicle will enter an intersection in violation of a traffic signal based on rectified video images of the vehicle approaching the image. The rectification process transforms the perspective view captured by the video camera to a view that portrays a vehicle approaching the intersection in accordance with units of physical distance measurement. Some embodiments transform the two-dimensional perspective view provided by the video camera to an overhead or "bird's-eye" view from above the vehicle or intersection. Based on the rectified images the system estimates vehicle speed and predicts intersection entry. The system optically monitors traffic signal state to determine whether vehicle entry into the intersection may be a signal violation.

Figure 1:
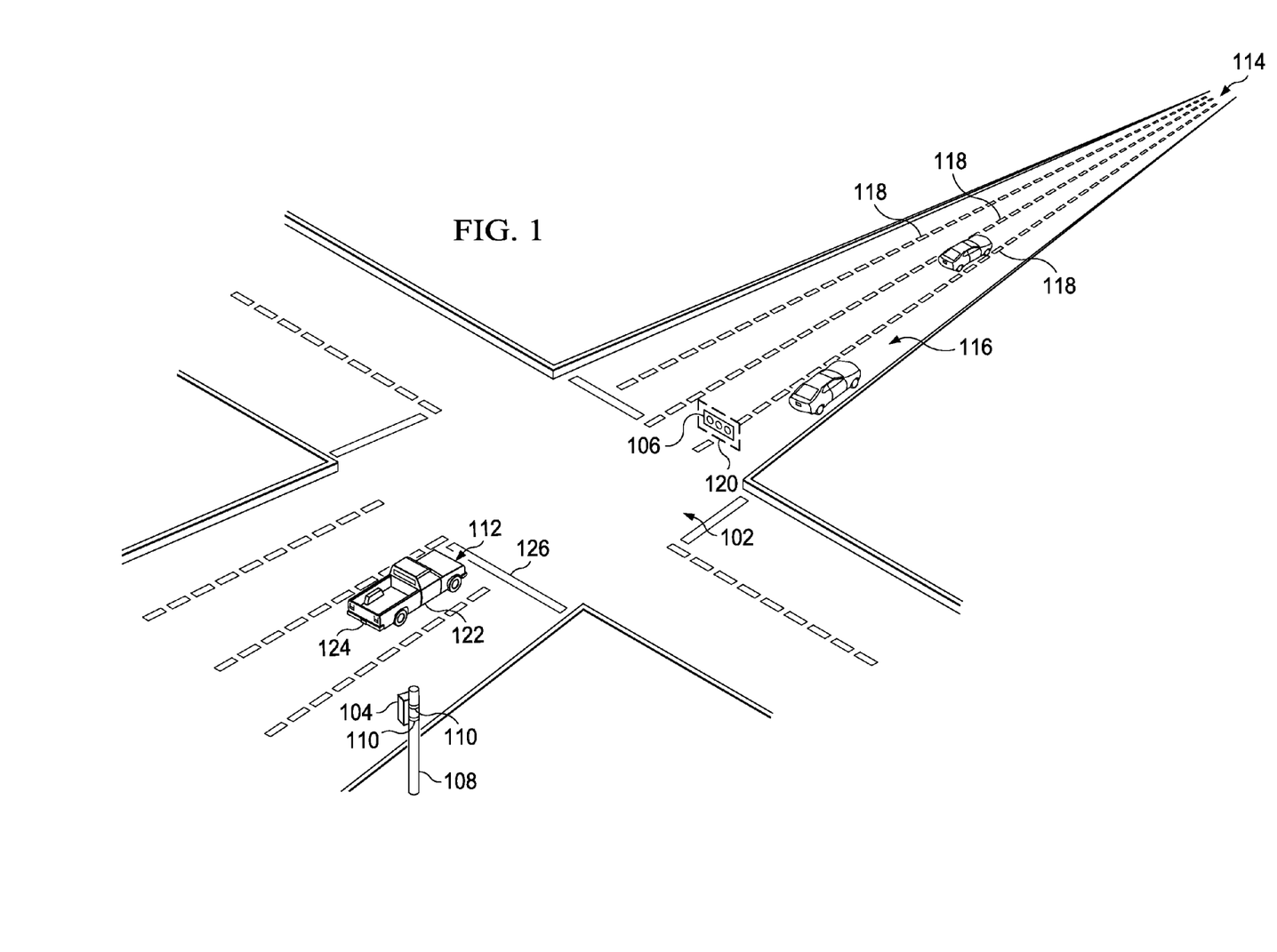
FIG. 1 is a perspective view showing an intersection monitored by a traffic monitoring system in accordance with various embodiments.

FIG. 1 is a perspective view showing an intersection 102 monitored by a traffic monitoring system 104 in accordance with various embodiments. The traffic monitoring system 104 is mounted to a structure 108, which may, for example, be a preexisting pole such as a streetlight pole, a sign pole, etc. Constrictive bands 110 or other attachment devices know in the art may be used to attach the traffic monitoring system 104 to the structure 108. The attachment of the traffic monitoring system 104 to the structure 108 provides the traffic monitoring system 104 with a view of the intersection 102, the traffic signal 106, vehicles 112 approaching the intersection 102, and a horizon 114 where lines parallel and/or perpendicular to the roadway 116, such as lane markers 118, intersect.

The traffic monitoring system 104 may be free of electrical connections to the signal 106 and systems controlling the signal 106. Instead, the traffic monitoring system 104 may optically monitor the traffic signal 106, or the area 120 about the traffic signal 106, to determine the state of the signal 106. The traffic monitoring system 104 may also be free of electrical connections to the power mains. Instead, the traffic monitoring system 104 may be battery powered and/or may include photovoltaic cells or other autonomous power generation systems to provide charging of the batteries and/or powering of the system 104. The traffic monitoring system 104 includes a wireless transceiver for communicating violation information and other data to/from a violation review/control site. In some embodiments, the wireless transceiver may comprise a modem for accessing a cellular network, a wireless wide area network, a wireless metropolitan areas network, a wireless local area network, etc.

The traffic monitoring system 104 may be free of electrical connections to vehicle sensors disposed outside of the monitoring system 104. The traffic monitoring system 104 includes a video camera that acquires video images of the intersection 102, vehicles approaching the intersection 102, and the roadway 116. The video images acquired by the monitoring system show a perspective view similar to that of FIG. 1. The perspective view, without additional information, such as distance between points on the roadway 116, is unsuitable for determining distance traveled by the vehicle 112, and consequently is unsuitable for determining the instantaneous speed of the vehicle 112. Embodiments of the traffic monitoring system 104 apply a rectification function to the video images. The rectification function transforms the images to allow accurate determination of distance traveled between video frames, and correspondingly allow accurate determination of instantaneous vehicle speed. Using the rectified video images, the traffic monitoring system 104 can predict whether the vehicle 112 will enter the intersection 102 (i.e., progress past the stop line 126) without additional sensors.

The traffic monitoring system 104 is also configured to capture high-resolution images of the signal 120, and the vehicle 112 ahead of and/or in the intersection 102, and to store the high-resolution image and video of the vehicle approaching and entering the intersection along with relevant data, such as time of the incident, vehicle speed, etc., and wirelessly transmit at least some of the stored data to a violation review site.

Because the traffic monitoring system 104 requires no connections to electrical utilities, wired communication systems, external sensors, etc., the traffic monitoring system 104 can be relocated to another intersection or operational location with minimal expense when violations at the intersection 102 diminish.

Figure 2:
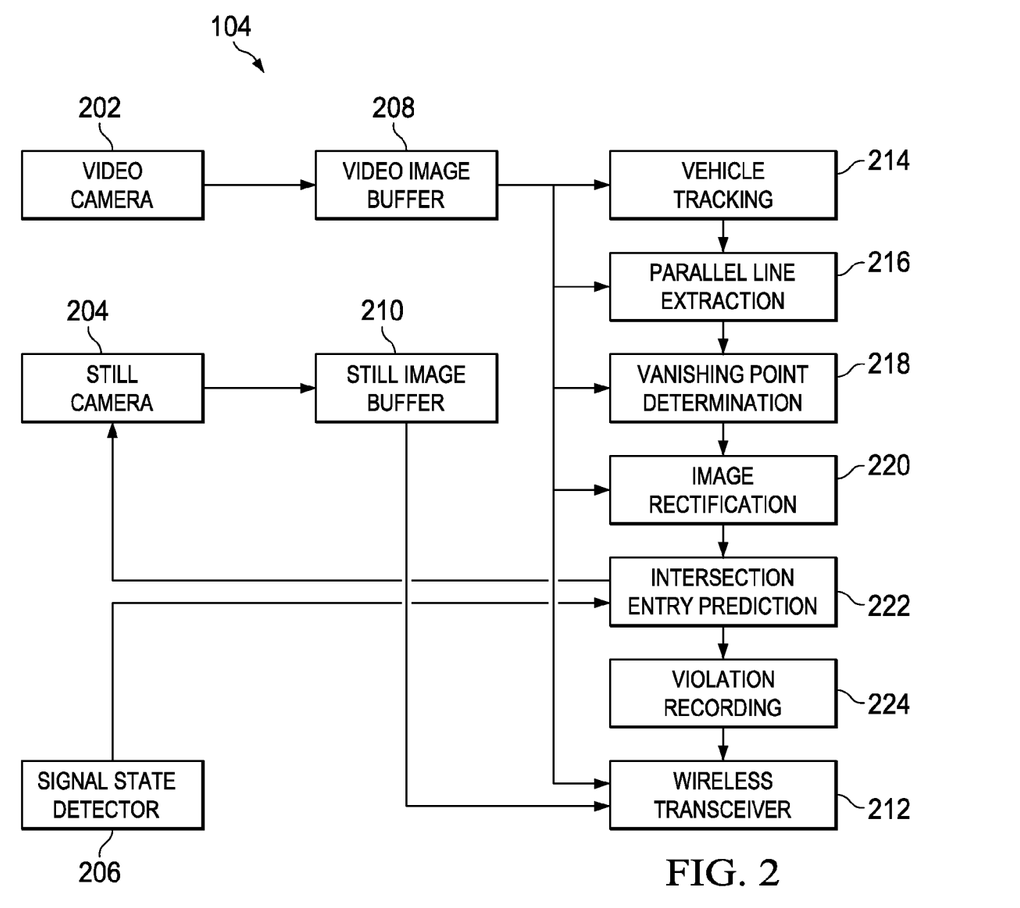
FIG. 2 shows a block diagram for a traffic monitoring system in accordance with various embodiments.

FIG. 2 shows a block diagram for a traffic monitoring system 104 in accordance with various embodiments. The traffic monitoring system 104 includes optical systems including a video camera 202, a high-resolution still camera 204, and a signal state detector 206. Some embodiments may also include lighting systems, such as flash units, to illuminate the intersection for image capture. A video image buffer 208 is coupled to the video camera 202 for storing video images, and a still image buffer 210 is coupled to the still camera 204 for storing still images. The video camera 202 may capture video images having, for example, 1920 pixel columns and 1080 pixel rows (i.e., 1080P video) or any other suitable video image resolution at a rate of 30 frames/second (fps), 60 fps, etc. The still camera 204 may provide a higher-resolution than the video camera. For example, the still camera may provide 16 mega-pixels or more of resolution.

A number of video image processing blocks are coupled to the video image buffer 208. The video image processing blocks include a vehicle detection and tracking block 214, a line extraction block 216, a vanishing point determination block 218, an image rectification block 220, and an intersection entry prediction block 222. Each of the video image processing blocks includes circuitry, such as a processor that executes software instructions, and/or dedicated electronic hardware that performs the various operations described herein.

The vehicle detection and tracking block 214 applies pre-processing to the video image, identifies the background elements of the scene captured by the video camera 202, and processes non-background elements to identify vehicles to be tracked. The pre-processing may include a number of operations, such as down-sampling to reduce data volume, smoothing, normalization, and patching. Down-sampling may be applied to reduce the volume of data stored and/or subsequently processed to an amount that suits the computational and storage limitations of the system 104. For example, the 1080p video provided by the video camera 104 may be down-sampled to quarter-size (i.e., 480×270 pixels). The down-sampling may include smoothing (i.e., low-pass filtering) to prevent aliasing. Some embodiments, apply smoothing with a 3×3 Gaussian kernel that perform a moving average.

Normalization is applied to mitigate variations in illumination of the intersection. Processing involving luminance thresholds is enhanced by consistent image signals. By linearly normalizing the video images, the full dynamic range of the depth field is made available for subsequent processing. Some processing blocks may be configured to manipulate an image that is an integer multiple of a predetermined number of pixels in width. For example, a digital signal processing component of a processing block may be configured to process images that are an integer multiple of 64 pixels in width. To optimize performance of the processing block, each row of the video image may be patched to achieve the desired width.

To identify vehicles to be tracked, the vehicle detection and tracking block 214 generates a background model and subtracts the background from each video frame. Some embodiments of the vehicle detection and tracking block 214 apply Gaussian Mixture Models (GMM) to generate the background model. GMM is particularly well suited for multimodal background distributions and normally uses 3 to 5 Gaussians (modes) to model each pixel with parameters $$\left(\vec{\mu}_i, \vec{\sigma}_i^2, \omega_i\right).$$

The vehicle detection and tracking block 214 dynamically learns about the background, and each pixel is classified as one of background or foreground. Parameters are updated for each frame, and only the Gaussians having matches (close enough to their mean) are updated in a running average fashion. The distributions for each pixel are ranked according to weight and variance ratio and higher weights are classified as background modes. The key updating equations are:

$$\omega_i \leftarrow \omega_i + \alpha(o_i^{(t)} - \omega_i), \quad (1)$$

$$\vec{\mu}_i \leftarrow \vec{\mu}_i + o_i^{(t)}\left(\frac{\alpha}{\omega_i}\right)\vec{\delta}_i, \text{ and} \quad (2)$$

$$\vec{\sigma}_i^2 \leftarrow \vec{\sigma}_i^2 + o_i^{(t)}\left(\frac{\alpha}{\omega_i}\right)(\vec{\delta}_i^T \vec{\delta}_i - \vec{\sigma}_i^2), \quad (3)$$

where:

$$\vec{\delta}_i = \vec{x}^{(t)} - \vec{\mu}_i$$

is a measure on now close the new pixel is to a given Gaussian, $o_i^{(t)}$ is an indicator for the measurement and set to 1 for a close Gaussian and 0 otherwise, and
$\alpha \sim (0,1)$ is the learning rate of the running average.

A predetermined number of initial video frames, for which no foreground vehicle identification is performed, may be used to generate a background model. Depending on the position of the system 104, vehicles may enter the field of view of the video camera 202 at either the bottom of field or at one of the left and right sides of the field. Embodiments may reduce the computational burden of background modeling by modeling the background only along the bottom edge and the side edge where a vehicle may enter the field of view of the video camera.

The vehicle detection and tracking block 214 identifies each vehicle (e.g., vehicle 112) traveling on the roadway 116 as the vehicle enters the field of view of the video camera 202, and tracks each vehicle as it moves along the roadway 116. The background model is subtracted from the video image to form a binary image consisting primarily of meaningless white spots exhibiting a disorderly arrangement due to noise and errors. The vehicle detection and tracking block 214 analyzes and organizes the foreground pixels into vehicle tracking candidates (i.e., vehicle "blobs"). The vehicle detection and tracking block 214 applies morphological processing and connected-component labeling to identify the vehicles.

Morphological processing is a family of techniques for analyzing and processing geometrical structures in a digital image, such as a binary image. It is based on set theory and provides processing, such as filtering, thinning and pruning. The vehicle detection and tracking block 214 applies morphological processing to fill the gaps between proximate large blobs and to prune isolated small blobs. Dilation and erosion are two basic and widely used operations in the morphological family. Dilation thickens or grows binary objects, while erosion thins or shrinks objects in the binary image. The pattern of thickening or thinning is determined by a structuring element. Typical structuring element shape options include a square, a cross, a disk, etc.

Mathematically, dilation and erosion are defined in terms of set theory:

$$\text{Dilation: } A \oplus B = \{z | (\hat{B})_z \cap A \neq \emptyset\} \quad (3)$$

$$\text{Erosion: } A \ominus B = \{z | (B)_z \cap A^c \neq \emptyset\} \quad (4)$$

where A is the target image and B is the structuring element. The dilation of A by B is a set of pixels that belongs to either the original A or a translated version B that has a non-null overlap with A. Erosion of A by B is the set of all structuring element origin locations where the translated version B has no overlap with the background of A.

Based on these two basic operations, the vehicle detection and tracking block 214 applies two secondary operations, image opening and closing:

$$\text{Opening: } A \circ B = (A \ominus B) \oplus B \quad (5)$$

$$\text{Closing: } A \bullet B = (A \oplus B) \ominus B \quad (6)$$

In general, opening by a disk eliminates all spikes extending into the background, while closing by a disk eliminates all cavities extending into the foreground.

Given a binary image with a number of clean blobs after the morphological processing, the vehicle detection and tracking block 214 determines the number of blobs and the location of each blob. Connected-component labeling is an application of graph theory used to detect and label regions as a number (e.g., 4 or 8) connected neighbors. Connected component labeling treats pixels as vertices and a pixel's relationship with neighboring pixels as connecting edges. A search algorithm traverses the entire image graph, labeling all the vertices based on the connectivity and information passed from their neighbors. Various algorithms may be applied to accelerate the labeling, such as two-pass algorithm, sequential algorithm, etc.

After the vehicle detection and tracking block 214 extracts vehicle blobs from the video frame, tracks will be initialized to localize the vehicles in subsequent frames. To avoid false tracks, such as duplicate vehicle detection, and to enhance track accuracy, the vehicle detection and tracking block 214 applies rule-based filtering to initialize the vehicle tracks. The rule-based filtering uses a confidence index to determine whether to initiate or delete a potential track.

Having initialized tracking of a vehicle, vehicle detection and tracking block 214 identifies the vehicle in subsequent video frames until the vehicle disappears or becomes too small to track. Tracking algorithms are normally classified into two categories: probabilistic and non-probabilistic. The probabilistic algorithms, such as particle filtering, are generally more robust and flexible than the non-probabilistic algorithms, and have much higher computational complexity.

The mean-shift based tracking algorithm is a popular non-probabilistic algorithm, and provides robust tracking results and high efficiency. The mean-shift tracking algorithm finds the best correspondence between a target and a model. Based on the assumption that an object won't move too fast in consecutive frames of an image sequence, at least part of target candidate is expected to fall within the model region of the previous video frame. By introducing a kernel function as the spatial information and calculating the gradient of the similarity measure function of two distributions, a direction, which indicates a place where the two distributions are more likely similar, is obtained.

In vehicle tracking, the motion of vehicles is generally restricted to the lanes of the roadway 116. Under such conditions, the mean-shift based algorithm provides robustness as well as high efficiency. With the assumption that vehicles are not completely occluded by each other, the mean-shift algorithm can handle partial occlusions as the tracking proceeds. To apply mean-shift based tracking, representation, similarity measure, and target localization are generally taken into consideration.

A color histogram (or intensity histogram for a gray-scale image) may be used as a representation of the object, and an optimized kernel function is incorporated to introduce spatial information, which applies more weight to center pixels and less weight to peripheral pixels. A typical kernel is the Epanechnikov profile:

$$k(x) = \begin{cases} \frac{1}{2}c_d^{-1}(d+2)(1-x) & x \leq 1 \\ 0 & \text{otherwise.} \end{cases} \quad (7)$$

With the spatial weights, the color histogram of the template is represented as:

$$\hat{q}_u = C \cdot \sum_{i=1}^{n} k(\|x_i\|^2) \cdot \delta[b(x_i) - u] \quad (8)$$

where $b(x_i)$ returns the index of the histogram to which a pixel belongs, and C is the normalization factor. Similarly, the representation of the target object at location y is given by:

$$\hat{p}_u(y) = C_h \cdot \sum_{i=1}^{n_h} k(\|y - x_i\|^2) \cdot \delta[b(x_i) - u] \quad (9)$$

A matching standard is applied to measure the similarity of the template and the target. The Bhattacharyya coefficient may be used to compare two weighted histograms as below, where the target location is obtained by maximizing the coefficient.

$$\rho(y) = \rho[\hat{p}(y), \hat{q}] = \sum_{u=1}^{m} \sqrt{\hat{p}_u(y) \cdot \hat{q}_u} \quad (10)$$

With regard to target localization, because it may be difficult to optimize the Bhattacharyya coefficient directly, the gradient of the coefficient is estimated by the Mean-Shift procedure. This is based on the fact that the mean of a set of samples in a density function is biased toward the local distribution maximum (the mode). Therefore, by taking the derivative of equation (10) and simplifying, the next Mean-Shift location is given by a relative shift $\hat{y}_1$ from the location of previous frame.

$$\hat{y}_1 = \sum_{i=1}^{n_b} w_i x_i \bigg/ \sum_{i=1}^{n_h} w_i \quad (11)$$

where the weights are given by $$w_i = \sum_{u=1}^{m} \sqrt{\hat{q}_u / \hat{p}_u(\hat{y}_0)} \cdot \delta[b(x_i) - u]. \quad (12)$$

The mean shift is an iterative procedure that is repeated until the target representation is deemed sufficiently close to the template. The complexity is directly determined by the number of iterations applied.

As noted above, the mean-shift tracking algorithm involves no motion information. For each frame of video, the starting position for the mean-shift iteration is the estimation result of the previous frame. The vehicle detection and tracking block 214 includes motion prediction that estimates a more accurate starting position for the next frame, thereby reducing the number of mean-shift iterations, and enhancing overall tracking efficiency. The vehicle detection and tracking block 214 includes a Kalman filter that predicts vehicle motion by observing previous measurements. Given the state dynamic function and the measurement equation, the Kalman filter employs observations over time to improve the prediction made by the dynamics. The updated state value tends to be closer to the true state, and the estimation uncertainty is greatly reduced. The two equations are given as, $$x_k = A x_{k-1} + B u_{k-1} + w_{k-1} \quad (13)$$

$$z_k = H x_k + v_k \quad (14)$$

where:
$x_k$ is the state vector,
$z_k$ is the measurement, and
the transition noise $w_k$, and measurement noise $v_k$ follow a zero-mean Gaussian distribution, respectively:

$$w_k \sim N(0, Q) \quad (15)$$

$$v_k \sim N(0, R) \quad (16)$$

Because these are linear Gaussian models, the Kalman filter is able to render a closed-form and optimal solution in two steps. The first step is prediction, in which the state vector is predicted by the state dynamics. When the most recent observation is available, the second step makes a correction by computing a weighted average of the predicted value and the measured value. Higher weight is given to the value with a smaller uncertainty. The prediction is defined as:

$$\hat{x}_{\bar{k}} = A\hat{x}_{k-1} + Bu_{k-1} \quad (17)$$

$$P_{\bar{k}} = AP_{k-1}A^T + Q \quad (18)$$

The correction is defined as:

$$K_k = P_{\bar{k}}H^T(HP_{\bar{k}}H^T + R)^{-1} \quad (19)$$

$$\hat{x}_k = \hat{x}_{\bar{k}}(z_k - H\hat{x}_{\bar{k}}) \quad (20)$$

$$P_k = (I - K_k H)P_{\bar{k}} \quad (21)$$

Thus, when the mean-shift iteration in the current frame is complete, the estimated location produced by the mean-shift serves as the newest measurement added to the Kalman filter, and the new mean-shift iteration start at the location predicted by the Kalman filter.

In order to rectify the video images and determine vehicle 112 location relative to the intersection 102, the system 104 extracts a number of lines from the images. The line extraction block 216 identifies parallel lines extending along and/or perpendicular to the roadway 116 for use in rectification, and identifies the stop line 126 for use in determining the position of the vehicle 112 relative to the intersection 102. Embodiments of the line extraction block 216 may identify lines based on roadway markings, such as lane markers 118 or a stop line 126 painted on the roadway 116, or based on the trajectories and/or attributes of the vehicles traversing the roadway 116.

On the roadway 116, the lane markers 118 and/or other painted markings are important environmental features that can be identified to generate parallel lines. Consequently, the line extraction block 216 is configured to identify parallel lines based on the lane markers 118 if the lane markings are adequate. Embodiments of the line extraction block 216 may implement such identification via processing that includes white line detection, edge detection by skeleton thinning, application of a Hough transform, and angle filtering.

The lane markers 118 and other lines painted on the roadway 116 are generally white. Consequently, the line extraction block 216 may apply a threshold to the hue, saturation, value (HSV) color space to detect the white area. Edge detection by skeleton thinning is applied to at least a portion of the post-threshold image. Edge detection by skeleton thinning is a type of morphological processing used to obtain the skeleton of a binary image. Skeleton processing is an irreversible procedure used to obtain the topology of a shape using a transform referred to as "hit-or-miss." In general, the transform applies the erosion operation and a pair of disjoint structuring elements to produce a certain configuration or pattern in the image.

The line extraction block 216 applies a Hough transform to the binary image including edge pixels resulting from the skeleton processing. The Hough transform groups the edge pixels into lines via a process that transforms the problem of line fitting into a voting mechanism in the parameter space. Generally, for line detection, the polar coordinate system, $\Sigma = x \cos\theta + y \sin\theta$, is preferred over the Cartesian coordinate system because vertical lines produce infinite values for the parameters a and b for the form, y=ax+b. Then, for a given edge point (x,y), $\rho = x \cos\theta + y \sin\theta$ is considered to be a curve with two unknowns ($\rho, \theta$), and a corresponding curve can be plotted in the parameter space. By quantizing both $\rho$ and $\theta$ into small bins, the two-dimensional parameter space is divided into small rectangular bins. Each bin with a curve passing by gets one vote. Once the voting is complete for all edge pixels, the bins with the highest number of votes will be deemed to correspond to the straight lines in the image coordinate.

There may be a number of lines in the image, including the lane markers 118, the stop line 126, etc. The angle of the lane markers 118 is known a priori for a given camera position, so, the line extraction block 216 may use angle filtering to differentiate between a lane marker 118 and other straight lines.

As an alternative or in addition to line identification based on lane markings 118, the line extraction block 216 may also derive lines (e.g., lines parallel to the roadway 116 or a stop line) from the trajectories or other attributes of the vehicles on the roadway 116. In line extraction based on vehicle trajectory, a single vehicle route conveys little information due to its variations, especially if the vehicle changes lanes during the tracking. Therefore, the line extraction block 216 collects a large number of tracks and applies an averaging process that enhances the certainty of the resultant average trajectory. Tracks with different lengths are transformed into a line space with only two parameters via line fitting using linear regression. A clustering method is applied to the data of the parameter space. The number of clusters and cluster centers are then identified. The cluster centers correspond to the lane centers in the image frame.

Each vehicle track has n points, $(x_i, y_i)$ i=1, 2, ..., n. The line extraction block 216 identifies a line, y=ax+b, fitting the points with minimum error. Using the least squares approach, the two parameters are given by:

$$a = \frac{n\sum_{i=1}^{n} x_i y_i - \sum_{i=1}^{n} x_i \sum_{i=1}^{n} y_i}{n\sum_{i=1}^{n} x_i^2 - \left(\sum_{i=1}^{n} x_i\right)^2} \quad (22)$$

$$b = \frac{n\sum_{i=1}^{n} y_i \sum_{i=1}^{n} x_i^2 - \sum_{i=1}^{n} x_i \sum_{i=1}^{n} x_i y_i}{n\sum_{i=1}^{n} x_i^2 - \left(\sum_{i=1}^{n} x_i\right)^2}. \quad (23)$$

Given a large number of the vehicle tracks, the "average" tracks are a good estimator for the lane centers. The line extraction block 216 applies k-means clustering to partition the tracks into clusters. The k-means algorithm identifies the number of clusters, k, and initializes the centroids for each cluster. The algorithm applies a two-step iterative procedure that performs data assignment and centroid update. The first step of the procedure assigns each data point to the cluster that has the nearest centroid. In the second step, each centroid of each of the k clusters is re-calculated based on all the data belonging to the cluster. The steps are repeated until the k centroids are fixed.

Two factors contribute to the success of the k-means clustering: the number of clusters and the initial centroids. A rough guideline suggests that all the centroids should be placed as far away from each other as possible to achieve a reasonable result. The line extraction block 216 applies a simple yet effective initialization algorithm for the k-mean clustering based on two observations. First, the number of clusters, i.e. the number of lanes, is predictable, usually ranging from 1 to 6. Second, most of the vehicle tracks stay in a given lane, with only a small number of vehicles changing lanes. Consequently, in the parameter space, the true clusters (corresponds to the lane centers) contain a large of number of data points.

The k-means clustering algorithm initializes by setting the first data as the temporary centroid of the first clusters. The algorithm then screens every data by calculating the shortest distance to all existing centroids. If the distance is less than a pre-defined assignment threshold, then the data is assigned to that cluster. If greater, then a new cluster is initialized and the data is the temporary centroid. Once the data screening is done, all the clusters are checked again. Clusters with a number of members less than a predetermined threshold are considered as outliers and pruned from the cluster pool. The number of the remaining clusters is the number k, and the centroids are used as the initials to start the clustering.

In situations where parallel lines (e.g., parallel lines along the roadway 116 or perpendicular to the roadway 116) are difficult to identify from the background image, some embodiments of the line extraction block 216 generate lines based on the line features of a vehicle. To obtain the line segments, the line extraction block 216 applies a procedure that is similar to the lane marker detection described above with a different edge detection method employed in some embodiment. While the lane marking detection is based on the background image, line generation based on a vehicle feature may be performed on every video frame after vehicle detection. A Canny edge detection algorithm is applied to the areas of the input image which correspond to the extracted blobs (i.e., the vehicles). The edge pixels are obtained, and line detection based on the Hough transform is applied with angle filtering as described above. A further checkup of the parallelism of the line segments is performed because not every vehicle may produce the desired feature.

In addition to detecting lines parallel to the roadway 116, the line extraction block 216 can also identify the stop line 126. The stop line 126 defines a boundary of the intersection 102, and consequently provides a basis for determining whether a vehicle has entered the intersection 102. Like the parallel lines described above, the stop line identification may be based on detection of a line painted on the roadway 116 or on vehicle motion or other attributes. If the stop line is visible, then the line extraction block 216 applies algorithms similar to those described above with regard to painted lane markings to identify the stop line. The stop line detection algorithm may apply a different angle filtering algorithm for detection of modes of the Hough space than that used to detect the lane markings.

If a painted stop line is unavailable and/or in conjunction with detection of a painted stop line, the line extraction block 216 may generate a stop line by fitting a line to the positions of vehicles stopped at the intersection 102. When the traffic signal 106 indicates a STOP state, the line extraction block 216 identifies vehicles having a very small translation across a number of video frames to be stopped vehicles. There may be more than one vehicle stopped in the same lane and only the vehicle closest to the intersection 102 is used to detect the stop line. Due to the camera position (i.e., facing the intersection from the rear of the vehicles), and the orientation of the coordinate system (i.e., origin at the top left corner of the 2-D image), only the vehicles having the smallest x-coordinate may be identified as the front-line stopping vehicle.

The stored trajectory data for each vehicle includes vehicle width and height in addition to vehicle position. The line extraction block 216 locates the vehicle stop position on the ground by extending a vertical line downward from the vehicle center. A large number (e.g., 50) of vehicle stop positions are accumulated for each lane, and a random sample consensus (RANSAC) algorithm may be applied to fit a line to the stop points. The RANSAC algorithm generates a line that optimally fits the vehicle positions while filtering outliers.

The vanishing point determination block 218 determines the points where the parallel lines extracted from the video images intersect. Thus, two vanishing points may be determined, the first based on parallel lines along the roadway 116 (e.g., lines extending in the direction of traffic flow being monitored) that intersect at the horizon 114 (i.e., the vanishing point), and the second based on parallel lines perpendicular to the roadway 116 e.g., lines parallel to the stop line 126 and/or vehicle edge 124) intersect to the side of the video frame. If only two parallel lines are detected, a vanishing point is calculated via a cross product of the two homogenous coordinates, as in:

$$vp = l_1 \times l_2. \tag{24}$$

If more than two parallel lines are identified, a least square optimization is performed to further reduce the estimation error.

The image rectification block 220 generates a rectification function based on the vanishing points identified by the vanishing point determination block 218, and applies the rectification function to the video images captured by the video camera 202. The rectification function alters the video images to cause distances between points in the rectified image to be representative of actual distances between points in the area of the image.

The image rectification block 220 may assume a pinhole camera model with zero roll angle, zero skew, a principle point at the image center, and a unity aspect ratio with the camera 202 mounted at the side of the roadway 116 facing the intersection 112. Considering a left-side camera 202, for example, a point (x,y,z) in world coordinates, is projected to a pixel (u,v) in the two dimensional image captured by the camera 202. Using homogeneous expression, the coordinates and pixels are associated by:

$$p = P\bar{x} = KRT\bar{x} \tag{25}$$

where:
$\bar{x} = [x,y,z,1]$,
$p = [\alpha u, \alpha v, \alpha]^T$,
$\alpha \neq 0$, and
$z = 0$ for points on the ground.

The matrix K represents the intrinsic parameters of the camera. R is a rotation matrix, and T is translates between the camera coordinate and the world coordinate.

$$K = \begin{bmatrix} f & 0 & 0 \\ 0 & f & 0 \\ 0 & 0 & 1 \end{bmatrix}, \tag{26}$$

$$R = \begin{bmatrix} 1 & 0 & 0 \\ 0 & -\sin\phi & -\cos\phi \\ 0 & \cos\phi & -\sin\phi \end{bmatrix}, \tag{27}$$

$$T = [It], \text{ and} \tag{28}$$

$$t = [0 \; 0 \; -h]^T, \tag{29}$$

where:
f is the focal length of the camera with a unit of pixels,
$\phi$ is the tilt angle,
$\theta$ is the pan angle used to align the world coordinate with the traffic direction, and
h is the camera height and is known to the system 104.

The image rectification block 220 estimates f, ϕ, and θ. Based on the fact that vanishing points are the intersections of parallel lines under the perspective projection, the expression for the two vanishing points are explicitly derived in terms of the unknowns.

$$u_0 = \frac{f\tan\theta}{\cos\phi} \quad (30)$$

$$v_0 = -f\tan\theta \quad (31)$$

$$u_1 = -\frac{f}{\cos\phi\tan\theta} \quad (32)$$

Where $(u_0,v_0)$ and $(u_1,v_1)$ are the coordinates of the two vanishing points in the 2-D image frame. Equations (30)-(32) with three unknowns can be solved as:

$$f = \sqrt{-(v_0^2 + u_0 u_1)} \quad (33)$$

$$\phi = \tan^{-1}\left(-\frac{v_0}{f}\right) \quad (34)$$

$$\theta = \tan^{-1}\left(-u_0 \frac{\cos\phi}{f}\right) \quad (35)$$

The two vanishing points are derived using the various approaches described above. Applying the vanishing points to solve equations (33)-(35) provides the values of f, and ϕ needed for image rectification. To transform the two-dimension video image to a rectified three-dimensional bird's-eye view, the image rectification block 220 solves for image coordinates with z=0 using:

$$u = \frac{fx\sec\phi}{y + h\tan\phi} \quad (36)$$

$$v = \frac{fh - fy\tan\phi}{y + h\tan\phi} \quad (37)$$

Thus, the image rectification block 220 generates a rectified bird's-eye view image by looking up a pixel value of each corresponding image coordinate. Assuming that z=0 for the image rectification is reasonable for the intersection monitoring system 104. Other applications may apply non-zero z.

The intersection entry prediction block 222 measures, based on the rectified images, the distance traveled by the vehicle 112 as it approaches the intersection 102 between video frames, and from the distance and frame timing (e.g., 16.6 ms/frame, 33.3 ms/frame, etc.) determines the speed of the vehicle 112 at the time of video was captured. Based on the speed of the vehicle 112 as it approaches the intersection 102, the intersection entry prediction block 222 formulates a prediction of whether the vehicle 112 will enter the intersection. For example, if the rectified images indicate that the vehicle 112 is traveling at 30 miles per hour at a distance of 10 feet from the entry point of the intersection 102, then the intersection entry prediction block 222 may predict that the vehicle 112 will enter the intersection 102 rather than stopping short of the intersection 102. If the vehicle 112 is predicted to enter the intersection 102 in violation of the traffic signal 106, then the intersection entry prediction block 222 can trigger the still camera 204 to capture a high-resolution image of the vehicle 112, the license plate 124 of the vehicle 112, the traffic signal 106, etc. while the vehicle is in the intersection 102. The still camera 204 may be triggered to capture the image at, for example, a predicted time that the vehicle 112 is expected to be in the intersection 102, where the time is derived from the determined speed of the vehicle 112. Other embodiments of the system 104 may trigger the still camera 106 based on different or additional information, such as vehicle tracking information indicating that the vehicle is presently in the intersection 102.

The signal state detector 206 is coupled to the intersection entry prediction block 206. The signal state detector 206 may comprise an optical system that gathers light from the proximity of the traffic signal 106 (e.g., the area 120 about the signal 106), and based on the gathered light, determines the state of the traffic signal 106. The signal state detector 206 may include a color sensor that detects light color without resolving an image. Thus, the signal state detector 206 may detect whether the traffic signal 106 is emitting green, yellow, or red light, and provide corresponding signal state information to the intersection entry prediction block 206. In some embodiments of the system 104, the intersection entry prediction block 222 may predict intersection entry only when the signal state detector 206 indicates that the traffic signal 106 is in a state where intersection entry would be violation (e.g., the traffic signal is red).

The violation recording block 224 records violation information based on the intersection entry predictions made by the intersection entry prediction block 206. Violation information recorded may include the time of the violation, video images related to the violation, computed vehicle speed, still images of the vehicle in the intersection, etc.

The wireless transceiver 212 provides wireless communication (e.g., radio frequency communication) between the system 104 and a central control site or violation viewing site. The violation recording block 224 may transmit all or a portion of the violation information recorded to the central site at any time after the violation is recorded. Violation information may also be stored in the system 104 for retrieval at any time after the violation is recorded.

Figure 3:
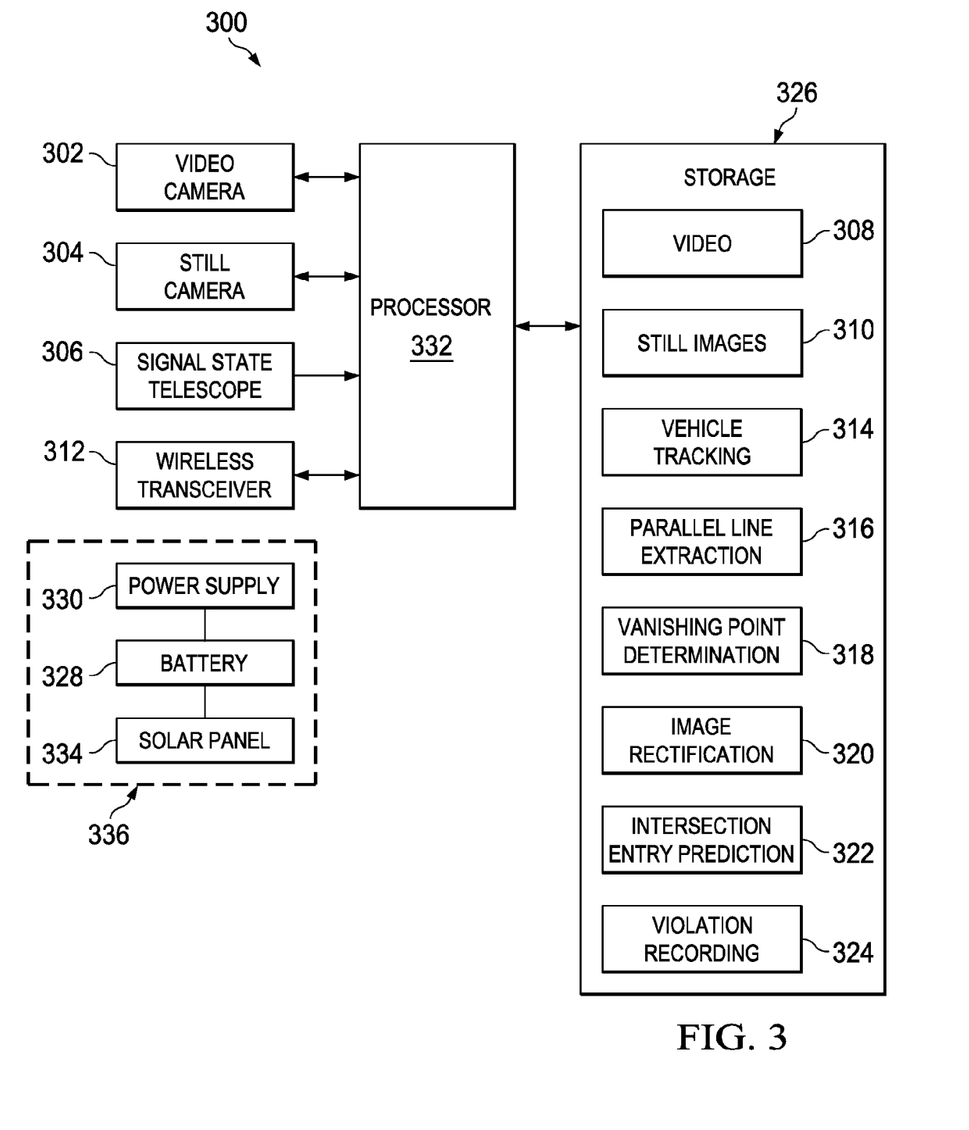
FIG. 3 shows a block diagram for processor-based traffic monitoring system in accordance with various embodiments.

FIG. 3 shows a block diagram for processor-based traffic monitoring system 300 in accordance with various embodiments. The processor-based system 300 may be used to implement the traffic monitoring system 104. The system 300 includes at least one processor 332. The processor 332 may be a general-purpose microprocessor, a digital signal processor, a microcontroller, or other processor suitable to perform the processing tasks disclosed herein. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Software programming in the form of instructions that cause the processor 332 to perform the operations disclosed herein can be stored in a storage device 326. The storage device 326 is a computer readable storage medium. A computer readable storage medium comprises volatile storage such as random access memory, non-volatile storage (e.g., a hard drive, an optical storage device (e.g., CD or DVD), FLASH storage, read-only-memory), or combinations thereof.

The processor 332 is coupled to the various optical system components. The video camera 302 captures video images of the intersection 102 as described herein with regard to the video camera 202. The processor 332 manipulates the video images as described herein. The still camera 304 captures high resolution images of vehicles in violation of the traffic signal 106 as described herein with regard to the still camera 204. The signal state telescope 306 includes the optical components and color detector that gather light from the traffic signal 106 as described herein with regard to the signal state detector 206. The processor 332 determines the state of the traffic signal based on the relative intensity of light colors detected by the signal state telescope 306. For example, if the signal state telescope is configured to detected red, green, and blue light, the processor 332 may combine the levels of red, green, and blue light detected to ascertain whether the traffic signal 106 is red, yellow, or green (i.e., stop short of intersection, prepare to stop short of intersection, proceed through intersection states).

The system 300 includes a power sub-system 336 that provides power to operate the processor 332 and other components of the system 300 without connecting to the power mains. The power supply 330 provides power to system components at requisite voltage and current levels. The power supply 330 may be coupled to a battery 328 and/or a solar panel 334 or other autonomous power generation system suitable for charging the battery and/or powering the system 300, such as a fuel cell. In some embodiments, the power supply 330 may be coupled to one or both of the battery 328 and the solar panel 334.

The wireless transceiver 312 communicatively couples the system 300 to a violation review/system control site. The wireless transceiver 312 may be configured to communicate in accordance with any of a variety of wireless standards. For example, embodiments of the wireless transceiver may provide wireless communication in accordance with one or more of the IEEE 802.11, IEEE 802.16, Ev-DO, HSPA, LTE, or other wireless communication standards.

The storage device 326 provides one or more types of storage (e.g., volatile, non-volatile, etc.) for data and instructions used by the system 300. The storage device 326 comprises a video buffer 308 for storing video images captured by the video camera 302, and a still image buffer 310 for storing still images captured by the still camera 304. Instructions stored in the storage device 326 include a vehicle tracking module 314, a parallel line extraction module 316, a vanishing point determination module 318, an image rectification module 320, an intersection entry prediction module 322, and a violation recording module 324. The modules 314-324 include instructions that when executed by the processor 332 cause the processor 332 to perform the functions described herein with regard to the blocks 214-224.

Figure 4A:
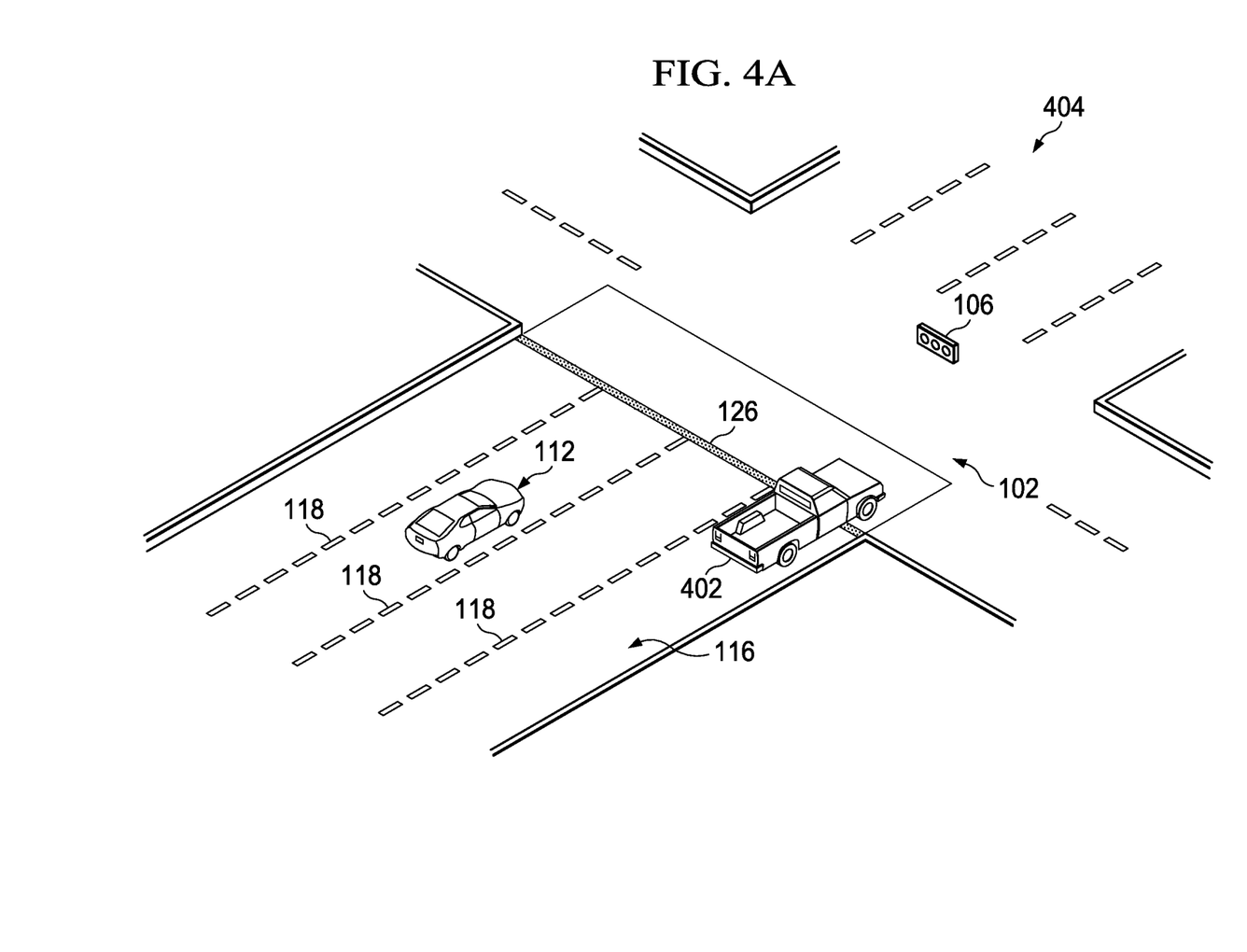
FIGS. 4A and 4B show respective illustrations of a perspective view image of an intersection as captured by a video camera and a rectified image based on the perspective view in accordance with various embodiments.
Figure 4B:
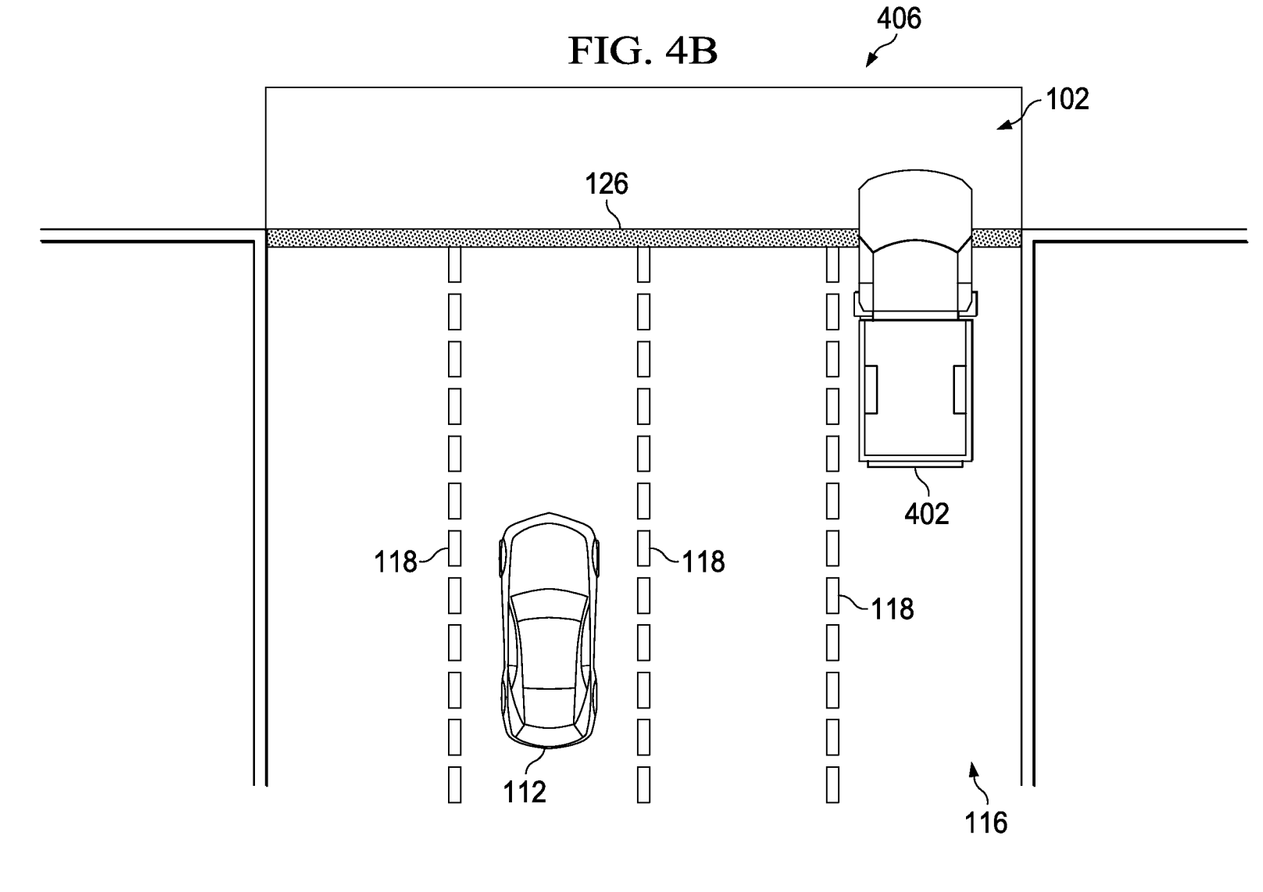

FIGS. 4A and 4B show respective illustrations of a perspective view image 404 of the intersection 102 as captured by the video camera 202 and a rectified image 406 generated by the image rectification block 220 from the perspective view image in accordance with various embodiments. In accordance with the two vanishing points established (parallel and perpendicular to traffic direction), both horizontal and vertical dimensions are considered when generating the rectified image 406. In practice, the rectified image 406 may exhibit some distortion due to magnitude of estimation error for the direction perpendicular to traffic. Such estimation error may result from the position of the video camera 202 relative to the monitored intersection 102.

Figure 5:
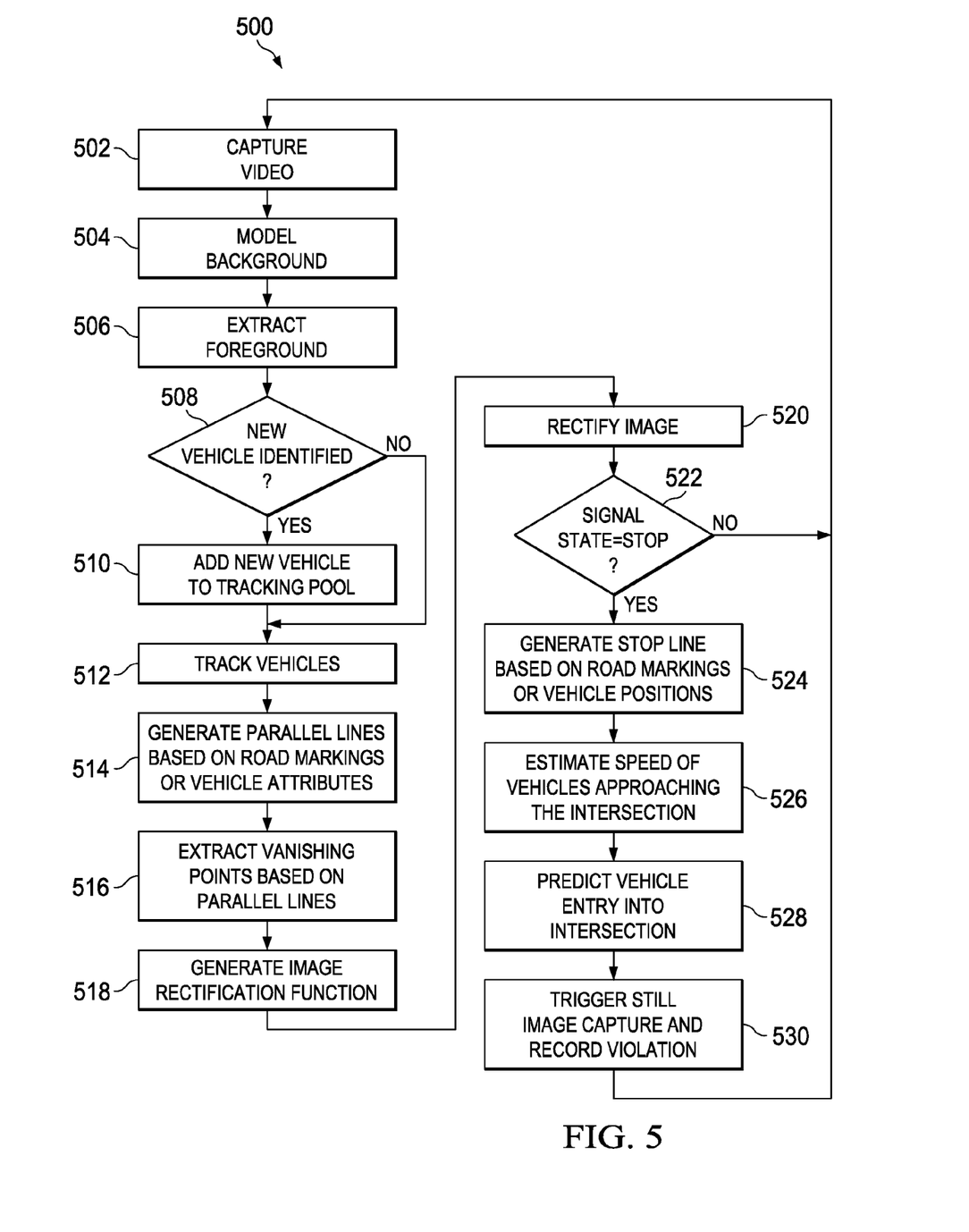
FIG. 5 shows a flow diagram for a method for detecting traffic signal violations in accordance with various embodiments.

FIG. 5 shows a flow diagram for a method for traffic signal state determination in accordance with various embodiments. Though depicted sequentially as a matter of convenience, at least some of the actions shown can be performed in a different order and/or performed in parallel. Additionally, some embodiments may perform only some of the actions shown. At least some of the actions shown may be performed by a processor 332 executing software instructions retrieved from a computer readable medium (e.g., storage 326).

In the method 500, the monitoring system 104 (e.g., as implemented by the system 300) has been installed at location to be monitored for traffic signal violations. Each of the video camera 202, the still camera 204, and the signal state detector 206 has been aligned and focused to capture a suitable view. For example, the signal state detector 206 may be arranged to gather light only from the area 120 about the signal 106, the video camera 302 may be arranged to capture images of the roadway 116 from a point ahead of the intersection 102 to the horizon 114, and the still camera 304 may be arranged to capture images of the intersection 102 and the signal 106.

In block 502, the video camera 202 is capturing images of the roadway 116 including the intersection 102 and a portion of the roadway 116 ahead of the intersection 102. The video images are stored in the video image buffer 208 for processing by the various video processing blocks 214-222.

In block 504, the vehicle detection and tracking block 214 models the background of the scene captured in the video images. The background model allows the vehicle detection and tracking block 214 to distinguish non-background elements, such as moving vehicles, from background elements. In some embodiments, the vehicle detection and tracking block 214 applies a Gaussian Mixture Model to identify background elements of the video images.

In block 506, the vehicle detection and tracking block 214 subtracts background elements identified by the background model from the video images, and extracts foreground (i.e., non-background) elements from the video images.

In block 508, the vehicle detection and tracking block 214 determines whether an identified foreground element represents a previously unidentified vehicle travelling on the roadway 116. If a new vehicle is identified, then, in block 510, the vehicle detection and tracking block 214 adds the new vehicle (e.g., an abstraction or identifier for the new vehicle) to a pool of vehicles being tracked.

In block 512, the vehicle detection and tracking block 214 tracks motion of the vehicles on the roadway 116. Some embodiments apply a Kalman filtering technique to predict and/or estimate the motion of each vehicle being tracked. Each vehicle is tracked as it enters the monitored area of the roadway 116 ahead of the traffic signal 106 until the vehicle disappears from view or otherwise leaves the roadway 116, at which time the vehicle is removed from the tracking pool.

In block 514, the line extraction block 216 generates various lines used to predict vehicle position. For example, lines parallel and/or perpendicular to the roadway 116 may be generated. Embodiments of the line extraction block 216 may generate the lines based on a number of features extracted from the video images. Some embodiments may generate the lines by identifying lane markings 118 or a stop line 126 painted on the roadway 116.

Some roads may include insufficient painted markings to allow for line extraction based thereon. Consequently, some embodiments of the line extraction block 216 employ other methods of line generation, for example, line generation based on the vehicles traveling along the roadway 116. Some embodiments may generate a line based on the movement or trajectory of each vehicle along the roadway as provided by the vehicle detection and tracking block 214. Some embodiments may apply a variation of the line generation based on vehicle tracking wherein an edge of the vehicle is identified and tracked as the vehicle moves along the roadway. Filtering may be applied to lines generated by these methods to attenuate noise related to vehicle lateral movement. Some embodiments may generate a line by identifying an edge (e.g., edge 122) of a vehicle approaching the traffic signal 106, and projecting the edge to form a line.

In block 516, the vanishing point determination block 218 identifies the point where the parallel lines generated by the parallel line extraction block 216 intersect. Based on the identified vanishing point, an image rectification function is generated in block 518. The image rectification function is applied to video images to alter the perspective of the images and allow for determination of distance traveled by a vehicle along the roadway 116 across frames of video. The image rectification function is applied to the video images in block 520.

In block 522, the state of the traffic signal is determined by the signal state detector 206. The signal state detector 206 optically monitors the traffic signal 106 by gathering light from a limited area 120 around the traffic signal 206. If the signal state detector 206 determines that the traffic signal state indicates a loss of right of way (e.g., red light, stop state) for vehicles crossing the intersection 102 on the roadway 116, then, in block 524, the line extraction block 216 generates a stop line that defines an intersection boundary. Embodiments of the line extraction block 216 may generate the stop line based on painted roadway markings or the positions of plurality of vehicles identified as stopped at the intersection over time.

In block 526, the intersection entry prediction block 222 estimates, based on the rectified video images, the speed of vehicles approaching the intersection 102, and predicts, in block 528, whether a vehicle will enter the intersection in violation of the traffic signal 106. The prediction may be based on the speed of the vehicle, as the vehicle approaches the intersection, derived from the rectified video images.

If a vehicle is predicted to enter the intersection in violation of the traffic signal, then, in block 530, intersection entry prediction block 222 triggers the still camera 204 to capture one or more images of the vehicle, the intersection, and the traffic signal. The still image, associated video, and violation information are recorded and an indication of the occurrence of the violation may be wirelessly transmitted to another location, such as a violation review site.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A traffic signal violation detection system, comprising:
    a video image capture device;
    an image rectifier configured to provide a rectified image by applying a rectification function to an image captured by the video image capture device;
    a vehicle position predictor configured to provide a prediction, based on the rectified image, of whether a vehicle approaching an intersection will enter the intersection; and
    a line generator configured to determine an intersection boundary line based on a stopping position of a plurality of vehicles at the intersection.

2. The system of claim 1, further comprising a battery; wherein the system is self-contained and powered by the battery.

3. The system of claim 1, further comprising a vehicle tracker configured to track vehicle position over a monitored path to a horizon of the video image capture device field of view.

4. The system of claim 1, wherein the image rectifier is configured to determine a vanishing point as an intersection of parallel lines at a horizon from one or more images captured by the video image capture device and generate the rectified image based on the vanishing point.

5. The system of claim 4, wherein the image rectifier is configured to determine the vanishing point by projecting lines along edges of detected vehicles to a point where the edges intersect.

6. The system of claim 4, wherein the image rectifier is configured to determine the vanishing point by tracking edges of vehicles over a plurality of images to a point where the edges intersect.

7. The system of claim 4, wherein the image rectifier is configured to determine the vanishing point by tracking vehicles over a plurality of images to a point where the vehicles intersect.

8. The system of claim 1, wherein the vehicle position predictor is configured to determine speed of the vehicle approaching the intersection based on the rectified image.

9. The system of claim 1, wherein the vehicle position predictor is configured to predict whether the vehicle approaching the intersection will enter the intersection based on vehicle speed determined based on a plurality of rectified images of the vehicle approaching the intersection.

10. The system of claim 1, further comprising a still image capture device coupled to the vehicle position predictor; wherein the vehicle position predictor is configured to trigger the still image capture device to capture an image of the vehicle in the intersection based on the prediction.

11. The system of claim 1, further comprising an optical signal state detector configured to determine a state of a traffic signal at the intersection based on light emitted by the traffic signal.

12. A method for predicting signal violations, comprising:
    capturing, by an intersection monitoring device, a video image of a street intersection;
    identifying, by the intersection monitoring device, a vehicle approaching the intersection in a frame of the video image;
    rectifying, by the intersection monitoring device, a frame of the video image;
    predicting, by the intersection monitoring device, based on the rectified image, whether the vehicle approaching the intersection will enter the intersection without stopping; and
    determining an intersection boundary line based on the positions of a plurality of vehicles stopped at the intersection.

13. The method of claim 12, further comprising tracking trajectories of a plurality of vehicles over a monitored path to a horizon of the monitoring device field of view.

14. The method of claim 12, further comprising:
    determining a first vanishing point as an intersection of parallel lines extending in a direction of monitored traffic flow from one or more images captured by the monitoring device;
    determining a second vanishing point as a intersection of parallel lines extending perpendicular to the direction of monitored traffic flow from one or more images captured by the monitoring device; and
    generating the rectified image based on the vanishing points.

15. The method of claim 14, further comprising determining at least one of the first and second vanishing points by projecting lines along edges of detected vehicles to a point where the edges intersect.

16. The method of claim 14, further comprising determining the first vanishing point by tracking edges of vehicles over a plurality of images to a point where the edges intersect.

17. The method of claim 14, further comprising determining the first vanishing point by tracking vehicles over a plurality of images to a point where the vehicles intersect.

18. The method of claim 12, further comprising estimating speed of the vehicle approaching the intersection based on the rectified image.

19. The method of claim 12, wherein the predicting comprises determining whether the vehicle approaching the intersection will enter the intersection based on an estimated speed of the vehicle determined based on a plurality of rectified image of the vehicle approaching the intersection.

20. The method of claim 12, further comprising:
triggering a still image capture device based on a result of the predicting; and
capturing a still image of the vehicle in the intersection.

21. The method of claim 20, further comprising:
determining a state of a traffic signal at the intersection using a light color sensor focused on the traffic signal;
wherein the triggering is responsive to determining the light color to be red.

22. A non-transitory computer-readable storage medium encoded with instructions that when executed cause a processor to:
store a video image of a street intersection;
identify a vehicle approaching the intersection in a frame of the video image;
apply a rectification function to the video image to produce a rectified image;
predict, based on the rectified image, whether the vehicle approaching the intersection will enter the intersection; and
determine an intersection boundary line based the positions of a plurality of vehicles stopped at the intersection.

23. The computer-readable medium of claim 22, further comprising instructions that when executed cause the processor to track trajectories of a plurality of vehicles over a monitored path to a horizon.

24. The computer-readable medium of claim 22, further comprising instructions that when executed cause the processor to:
determine a vanishing point as an intersection of parallel lines at a horizon from the video image; and
generate the rectified image based on the vanishing point.

25. The computer-readable medium of claim 24, further comprising instructions that when executed cause the processor to determine the vanishing point by at least one of:
projecting lines along edges of detected vehicles to a point where the edges intersect;
tracking edges of vehicles over a plurality of images to a point where the edges intersect; and
tracking vehicles over a plurality of images to a point where the vehicles intersect.

26. The computer-readable medium of claim 22, further comprising instructions that when executed cause the processor to:
estimate speed of the vehicle approaching the intersection based on the rectified image; and
determine whether the vehicle approaching the intersection will enter the intersection based on an estimated speed of the vehicle at a predetermined distance from the intersection.

27. The computer-readable medium of claim 22, further comprising instructions that when executed cause the processor to trigger a still image capture device to capture a still image of the vehicle in the intersection based on a result of the prediction.

28. The computer-readable medium of claim 26, further comprising instructions that when executed cause the processor to:
determine a state of a traffic signal at the intersection using a light color sensor focused on the traffic signal; and
trigger the still image capture device responsive to determining the light color to indicate a stop state.

* * * * *